United States Patent

[11] 3,627,719

[72] Inventor Lucien Sellet
 Saddle River, N.J.
[21] Appl. No. 788,340
[22] Filed Dec. 31, 1968
[45] Patented Dec. 14, 1971
[73] Assignee Diamond Shamrock Corporation
 Cleveland, Ohio
 The portion of the term of the patent subsequent to Aug. 19, 1986, has been disclaimed.

[54] COMPOSITIONS CONTAINING POLYURETHANE RESIN TREATING AGENTS DERIVED FROM MANNICH BASE CONDENSATES
 31 Claims, No Drawings
[52] U.S. Cl. ..................................................260/29.2 TN,
 260/29.4 R, 260/67.5, 260/70 R, 260/849,
 260/858, 117/161 UT
[51] Int. Cl. .....................................................C08g 37/24,
 C08g 41/00
[50] Field of Search.......................... 260/29.2
 TN, 29.4, 70, 70 M, 849, 850, 857, 858, 851, 67.5,
 70 R; 117/161 UT

[56] References Cited
UNITED STATES PATENTS

| | | | |
|---|---|---|---|
| 3,242,230 | 3/1966 | Habib............................. | 260/29.2 |
| 3,268,467 | 8/1966 | Rye et al........................ | 260/29.4 |
| 3,384,606 | 5/1968 | Dieterich et al. .............. | 260/29.2 |
| 3,427,272 | 2/1969 | Bolinger et al................. | 260/29.4 |
| 3,462,237 | 8/1969 | Sellet............................. | 260/29.2 |

Primary Examiner—Donald J. Arnold
Assistant Examiner—Herbert Mintz
Attorneys—C. Thomas Cross, Roy Davis, Timothy E. Tinkler, Dick M. Warburton, John J. Freer, Sam E. Laub, Neal T. Levin, Leslie G. Nunn, Jr. and Helen P. Brush ABSTRACT: Compositions containing polyurethane resin treating agents derived from Mannich Base condensates are used to improve properties of fiber, textile, paper, leather and other substrates. The treating agents are alkylolated polyurethane resins obtained by alkylolation of the reaction product of a Mannich Base condensate and a urethane prepolymer. Mannich Base condensates are prepared by reaction of alkanolamines, aldehydes, and amino resin bases.

COMPOSITIONS CONTAINING POLYURETHANE RESIN TREATING AGENTS DERIVED FROM MANNICH BASE CONDENSATES

BACKGROUND OF THE INVENTION

This invention relates to compositions of polyurethane resin treating agents derived from Mannich Base condensates, their preparation and use in improvement of properties of fiber, textile, paper, leather and like substrates. The treating agents are alkylolated polyurethane resins obtained by alkylolation of the reaction product of a Mannich Base condensate and an isocyanate terminated urethane prepolymer. Mannich Base condensates are prepared by reaction of alkanolamines, aldehydes and amino resin bases. The treating agent compositions can also contain acids, surfactants, pigments, solvents or other additives.

Treating agent compositions previously used in the treatment of fiber, textile, paper and like substrates were formulated products containing mixtures of polymers such as aminoplast resins, phenoplast resins or the like and polyurethane resins. These compositions were mixtures of resin components. Interreaction of the individual resin components was effected after the mixture was applied to the substrate. U.S. Pat. No. 3,242,230 Habib, Mar. 22, 1966 describes compositions containing mixtures of polyurethane resins and aminoplast or phenoplast resins and their use. It was usually necessary to add auxiliary agents such as plasticizers, softeners, antistatic agents or the like to the compositions to improve their properties.

It is an object of the present invention to provide improved polyurethane resin treating agent compositions for use on fiber, textile, paper, leather and the like substances. Another object is to provide processes for producing these compositions. Still another object is to provide processes for treating fiber, textile, paper, leather and like substrates. A further object is to provide improved fiber, textile, paper, leather and like substrates treated with these compositions. Other objects will become apparent from the detailed description given hereinafter. It is intended, however, that the description and specific examples do not limit the present invention but merely indicate preferred embodiments thereof.

SUMMARY OF THE INVENTION

The above as well as other objects of this invention have been achieved in the following manner. I have prepared and used in the treatment of fiber, textile, paper, leather and the like substrates polyurethane resin treating agent compositions which can be broadly described as alkylolated polyurethane resin compositions obtained by alkylolation of the reaction product of a Mannich Base condensate and an isocyanate terminated urethane prepolymer.

Mannich Base Condensates are obtained by the Mannich reaction using an alkanolamine, an aldehyde and an amino resin base having at least one reactive hydrogen atom. They are prepared by reacting together at least 1 mole of an alkanolamine and at least 1 mole of an aldehyde, the alkanolamine and aldehyde being present in equimolar quantities, to obtain the alkylol adduct of the alkanolamine (a hydroxyalkyl alkanolamine) and thereafter reacting 1 mole of at least one amino resin base, having at least one reactive hydrogen atom with at least 1 mole of said alkylol adduct of said alkylolamine. If desired, sufficient amounts of said alkylol adduct of said alkylolamine can be reacted with the amino resin base so as to react with some or up to all of the reactive hydrogen atoms of the amino resin base. Useful reactants are alkanolamines such as monoalkanolamines and dialkanolamines, said alkanolamines having alkylene groups containing at least two carbon atoms, aldehydes containing from one to seven carbon atoms and aldehyde liberating compositions thereof and amino resin bases having at least one reactive hydrogen atom.

The Mannich Base condensate is reacted with an isocyanate terminated urethane prepolymer and the resulting reaction product alkylolated by reaction of an aldehyde with reactive hydrogen atoms present in the reaction product to obtain an alkylolated polyurethane resin treating agent. The treating agent composition is then prepared by adding acids, surfactants, pigments, solvents or other additives to the alkylolated polyurethane resin.

If desired, a hydroxylic compound such as an alcohol, phenol, hydroxyl terminated polyether or polyester can be mixed with the Mannich Base condensate and the resulting mixture reacted with the isocyanate terminated urethane prepolymer provided at least one mole of the Mannich Base condensate is present. The resulting reaction product is then alkylolated using an aldehyde or an aldehyde liberating composition.

Compositions of alkylolated polyurethane resin treating agents derived from Mannich Base condensates are useful in the treatment of fibrous, porous and nonporous substrates. These compositions are applied to the substrate and cured. Curing is effected by interreaction of alkylol groups present in the alkylolated polyurethane resin component or by reaction of the alkylol groups with reactive hydrogen atoms present in the compositions or in the substrate to form more highly polymerized polyurethane resins. Properties of fiber, textile, paper, leather and like substrates can be improved by applying the compositions to these substrates and curing the compositions in situ. The compositions can be used in such diverse operations as coating, impregnating, dispersing, finishing, dyeing, pigment or dyestuff binding, tanning, retanning or the like to improve properties of substrates such as leather, paper, glass, plastic, wood, textile or the like.

DESCRIPTION OF THE PREFERRED EMBODIMENTS

I. Preparation of Mannich Base Compounds

The Mannich Base condensates are reaction products of (1) at least 1 mole of of least one alkanolamine such as monoalkanolamine or dialkanolamine wherein the alkylene groups contain at least two carbon atoms, (2) at least 1 mole of at least one aldehyde or aldehyde liberating composition which will provide an aldehyde having from one to seven carbon atoms and (3) 1 mole of at least one amino resin base having at least one reactive hydrogen atom present in the molecule wherein the alkanolamine and aldehyde are present in equimolar quantities and one mole of the amino resin base is present. These Mannich Base condensates are prepared by the Mannich reaction. At least 1 mole of the aldehyde or aldehyde liberating composition and at least 1 mole of alkanolamine are reacted with a reactive hydrogen atom present in the amino resin base. If more than one reactive hydrogen atom is present in the amino resin base, more than 1 mole of an alkanolamine and more than 1 mole of an aldehyde can be reacted with the amino resin base. For example, dicyandiamide has four reactive hydrogen atoms, thus one, two, three or four of these reactive hydrogen atoms can be reacted using the Mannich reaction. Likewise, there are three reactive hydrogen atoms in monomethylurea and one, two or three of these reactive hydrogen atoms can be reacted using the Mannich reaction.

Alkanolamines which can be used in the preparation of Mannich Base condensates include monoalkanolamines and dialkanolamines wherein the alkylene group contains at least two carbon atoms and can contain 12 or more carbon atoms. Useful alkanolamines include monoethanolamine, diethanolamine, N-methyl monoethanolamine, N-ethyl monoethanolamine, dipropanolamines, monopropanolamines, N-alkyl monopropanolamines, dibutanolamines, monobutanolamines, N-alkyl monobutanolamines, monohexanolamine, monododecanolamine, their isomers, their higher homologues or the like.

Aldehydes which can be used in the preparation of Mannich Base condensates include aldehydes having from one to seven carbon atoms and aldehyde liberating compositions thereof. Formaldehyde can be used in the form of 30 to 40 percent aqueous solutions, 30 to 55 percent alcohol solutions with alcohols such as methanol, n-butanol, i-butanol or the like. Aldehydes such as acetaldehydes, butyraldehyde, furfuraldehyde, chloral, alpha-ethyl-beta-propylacrolein, benzaldehyde or the like can be used instead of formaldehyde in the Mannich reaction. Aldehyde liberating compositions such as polymeric forms of formaldehyde, e.g., paraformaldehyde, trioxane, hexamethylene tetramine or the like, can be used. Likewise, aldehyde liberating compositions such as acetals which liberate aldehydes can be used. Other aldehyde liberating compositions also include aldehydes and hydrogen chloride mixtures wherein the amino resin base is chloromethylated and then reacted with an alkanolamine to obtain the desired Mannich Base condensate.

Amino resin bases, which may be used in the preparation of Mannich Base condensates, include dicyandiamide, guanidine, guanylurea, urea, thiourea, biuret, melamine, ammeline, ammelide, cyanuric acid, guanamines, e.g., [2-alkyl (or aryl)-4-6-diamino-1,3,5-triazines], derivatives thereof having at least one reactive hydrogen atom per molecule and their mixtures.

The outstanding properties of the alkylolated polyurethane resin treating agents obtained in this invention are in part attributed to the Mannich Base condensates used in their preparation. The Mannich Base condensates are amino resin base condensates which contain in the case of formaldehyde or formaldehyde liberating compositions, the methylenic alkanolamine radicals shown in formulas (I) and (II):

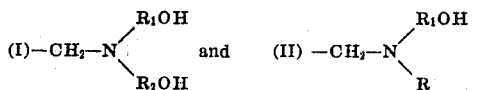

where R is hydrogen or an alkyl radical containing from about one to about six carbon atoms, $R_1$ is an alkylene group containing from about two to about twelve or more carbon atoms and $R_2$ is an alkylene group containing from about two to twelve or more carbon atoms. $R_1$ and $R_2$ can be alike or different and can be vicinal alkylene groups. These Mannich Base condensates are in effect hydroxyl containing nitrogen compounds or nitrogen containing polyols.

Mannich Base condensates can be prepared by reaction of the alkanolamine, aldehyde and amino resin base at from about 5° to about 110° C. Usually, from 1 to 12 or more moles of the desired alkanolamine and a solvent such as water or a monohydric alcohol are charged to a reactor equipped with agitator, reflux condenser and provision for external heating and cooling. The amine solution is cooled to about 5° to about 15° C. and a solution of from 1 to 3 or more moles of an aldehyde in a solvent such as water or a monohydric alcohol is added to the cooled alkanolamine solution over a period of from about one-half to 2 hours. Equimolar quantities of aldehyde and alkanolamine are present. The temperature is maintained preferably below 15° C. during this addition and reaction. The resulting reaction product is the alkylol adduct of the alkanolamine (a hydroxyalkyl alkanolamine). For example, hydroxymethyl diethanolamine is obtained when equimolar quantities of formaldehyde and diethanolamine are reacted.

A solution containing 1 mole of the desired amino resin base in a solvent such as water or a monohydric alcohol is then added to the reaction mixture containing one mole of the alkylol adduct of the alkanolamine for each reactive hydrogen atom in the amino resin base to be reacted over a period generally of from ½ to 2 hours while the temperature is maintained in the range of from about 15° to 40° C. The resulting reaction mixture is then stirred for an additional 15 minutes to 2 hours at a temperature of from about 15° to 40° C., then heated to about 60° to 90° C. and held at about 60° to 90° C. for from 1 to 4 hours to complete reaction. The reaction product, the desired Mannich Base condensate is then vacuum distilled to remove water, monohydric alcohols and other volatiles. Vacuum distillation is continued at about 90° to about 110° C. until the water content of the Mannich Base condensate is about 0.2 percent or less by weight or less.

Reactions (III) and (IV) illustrate preparation of the methylol adduct of diethanolamine (hydroxymethyl diethanolamine) from 1 mole of formaldehyde and 1 mole of diethanolamine and its subsequent reaction with 1 mole of dicyandiamide, an amino base resin to obtain a Mannich Base condensate. Reaction is carried out in an aqueous solution. Water or other volatile materials are then removed by vacuum distillation to recover the Mannich Base condensate in the form of a viscous stable substantially anhydrous liquid containing less than 0.2 percent or less by weight of water.

Another useful Mannich Base condensate can be prepared by reaction of 6 moles of hydroxymethyl diethanolamine with

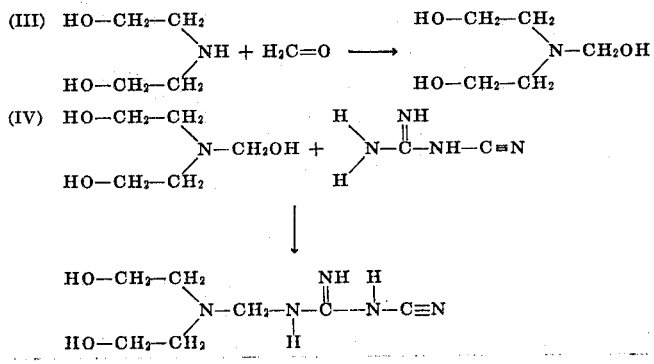

2 moles of dicyandiamide to obtain 2 moles of a Mannich Base condensate followed by condensation of the 2 moles of Mannich Base condensate with formaldehyde to obtain a second Mannich Base condensate, a bis Mannich Base condensate. The bis Mannich Base condensate is prepared in aqueous solution and then vacuum distilled to remove water and other volatiles. The resulting product is a clear viscous liquid in substantially anhydrous form and is believed to have the structure shown in formula (V).

(V) 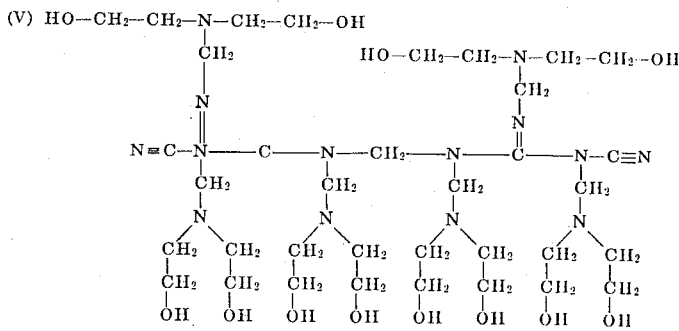

II. Preparation of Prepolymers

Isocyanate terminated urethane prepolymers for reaction with the Mannich Base condensates are prepared by reacting at least one organic polyisocyanate with at least one hydroxyl terminated compound having at least two terminal hydroxyl groups such as polyol, which is an alkylene polyol, a polyether, which is a polyoxyalkylene polyol, or a polyester. These urethane prepolymers are isocyanate terminated adducts of an organic polyisocyanate and one of the above hydroxyl terminated compounds. The sole reactive groups in these isocyanate terminated prepolymers are reactive isocyanate groups. These isocyanate terminated urethane prepolymers are well known in the art and are often used instead of organic polyisocyanates because they are less toxic and have lower volatilities than organic polyisocyanates.

Isocyanate terminated urethane prepolymers are prepared under anhydrous conditions by mixing a hydroxyl terminated compound with an excess or an organic polyisocyanate and heating the resulting reaction mixture to a temperature of from about 50° to about 100° C. and reacting the reaction mixture at about 50° to about 100° C. to obtain a prepolymer whose sole reactive groups are reactive isocyanate groups. An alternate procedure is to react a polyisocyanate with a molar excess of a polyol, a polyether or a polyester having at least two terminal hydroxyl groups, to obtain a hydroxyl group terminated reaction product, then cap the resulting reaction product, that is, react it with additional organic polyisocyanate so that the sole reactive groups present in the prepolymer are reactive isocyanate groups.

The terms polyol and alkylene polyol encompass any hydroxyl containing alkylene compound which has diol, triol or higher hydroxyl functionality and has at least two terminal hydroxyl groups. The terms polyether and oxyalkylene polyol encompass any hydroxyl containing polyether compound which has diol, triol or higher hydroxyl functionality and has at least two terminal hydroxyl groups. The polyesters, likewise, have at least two terminal hydroxyl groups.

An excess of polyisocyanate represents at least 1.1 isocyanate group for each terminal hydroxyl group present in the hydroxyl terminated compound. The preferred ratio of equivalents of isocyanate groups to hydroxyl groups in the prepolymer is about 2.1. If desired, the quantity of reactive isocyanate present in the prepolymer can be expressed on a weight percentage basis. Thus, for example, a prepolymer prepared from tolylene diisocyanate and a polyoxyethylene glycol having an average molecular weight of 300 has an isocyanate content of 14.3 percent by weight. It is clear that as the weight of the polyoxyethylene glycol increases, the weight percent of isocyanate in the prepolymer will decrease. Thus, a prepolymer from tolylene diisocyanate and a polyoxyethylene glycol having an average molecular weight of 3,350 will have an isocyanate content of 2.3 percent by weight.

When the prepolymer is a reaction product of a polyol, that is, an alkylene polyol such as trimethylol propane and a polyisocyanate such as tolylene diisocyanate, the prepolymer is customarily described as the reaction product of about 1 mole of trimethylol propane and about 3 moles of tolylene diisocyanate and the isocyanate content is not given. Examples of polyol prepolymers include the reaction product of tolylene diisocyanate with trimethylol propane at an NCO/OH ratio of 2:1 (Mondur CB) and the reaction product of tolylene diisocyanate with 1,2,6-hexantriol at an NCO/OH ratio of 2:1. These prepolymers are well known in the art and have been used extensively. Likewise, when the prepolymer is the reaction product of a polyester and a polyisocyanate, it is described in terms of the polyester and polyisocyanate and the isocyanate content is not given. These prepolymers can be classified as polyether prepolymers, polyol prepolymers and polyester prepolymers or generally as isocyanate terminated urethane prepolymers or prepolymers.

Representative polyisocyanates, which can be used in the preparation of prepolymers, include tolylene diisocyanate, tolylene-2,4-diisocyanate, tolylene-2,6-diisocyanate, tolylene diisocyanate (65% 2,4; 35% 2,6), tolylene diisocyanate (80% 2,4; 20% 2,6), 1,6-hexamethylenediisocyanate (HDI), 1,4-tetramethylenediisocyanate, hexamethylenediisocyanate, 1,10-decamethylenediisocyanate, 1,5-naphthalenediisocyanate (NDI), cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, diphenyl methane-4,4'-diisocyanate (MDI), 5,6-dimethyl-1,3-phenylenediisocyanate, 2,4-dimethyl-1,3-phenylenediisocyanate, 4-isopropyl-1,3-phenylenediisocyanate, 4,4'-diisocyanatodiphenylether, benzidinediisocyanate, o-nitrobenzidinediisocyanate, 4,6-dimethyl-1,3-phenylenediisocyanate, 9,10-anthracenediisocyanate, 4,4'-diisocyanatodibenzyl, 3,3'-dimethyl-4,4'-diisocyanatodiphenylmethane, 2,6-dimethyl-4,4'-diisocyanatodiphenyl, 2,4-diisocyanatostilbene, 4,4-diphenyl diisocyanate (XDI), 3,3'-dimethyl-4,4'-diphenyldiisocyanate (TQDI), 3,3'-dimethoxy-4,4'-diphenyl diisocyanate (DADI), 1,4-anthracenediisocyanate, mesitylene diisocyanate, durylene diisocyanate, 2,5-fluorenediisocyanate, 1,8-naphthalenediisocyanate, 2,6-diisocyanatobenzofuran, 2,4,6-toluenetriisocyanate, tritolymethane triisocyanate, 2,4,4'-triisocyanatophenyl ether and the like. Another useful isocyanate (PAP-1) has the formula

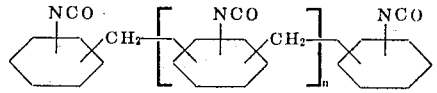

where n has an average value of about 1. 4,4'-methylene bis (cyclohexane isocyanate) and DDI, a diisocyanate derived from dimer acids by General Mills, which was a molecular weight of about 600, can be used. Mixtures of polyisocyanates can also be used.

Useful isocyanate terminated urethane prepolymers include the reaction products of tolylene diisocyanates and polyethers (polyalkylene polyols). Polyethers used in these prepolymers can have average molecular weights of about 136 to 5,000 and preferably 600 to 4,000 and include, for example, polyoxyethylene glycol having a molecular weight of 1,540, polyoxypropylene glycol having a molecular weight of 1,025, polyoxytetramethylene glycol, polyoxyhexamethylene glycol, polyoxyoctamethylene glycol, polyoxynonamethylene glycol, polyoxydecamethylene glycol, polyoxydodecamethylene glycol and mixtures thereof. Block polymers of the formula $$HO(C_2H_4O)_a(C_3H_6O)_b(C_2H_4O)_cH$$

can be prepared by sequential addition of ethylene oxide to polyoxypropylene glycol so that the molecular weight of the polymers vary from about 400 to 4,000. Other alkylene oxides and polyoxypropylene glycols can be used.

Other polyesters, which can be used in the preparation of the polyether prepolymers, include those prepared by reaction of 1,2-alkylene oxides such as ethylene oxide, propylene oxide, butylene oxide, their mixtures and the like with polyhydroxy compounds 3,000 as glycerol, hydroxyl containing glycerides, trimethylolethane, trimethylolpropane, 1,2,6-hexanetriol, pentaerythritol, dipentaerythritol, tripentaerythritol, sorbitol, mannitol and the like, glucosides such as methyl, ethyl, propyl, butyl and 2-ethylhexyl arabinoside, xyloside, fructoside, glycoside, rhamnicoside and sucrose. For example, an ethylene oxide adduct of glycerol having an average molecular weight of 2,000 can be used. A propylene oxide adduct of trimethylolpropane terminated with ethylene oxide to obtain a product with primary hydroxyl groups having an average molecular weight of 4,500 can also be used. Likewise, an ethylene oxide adduct of pentaerythritol having an average molecular weight of 3,000 can be used. A propylene oxide adduct of 1,2,6-hexanetriol having an average molecular weight of 1,000 can be used. Polyoxyalkylene polyols obtained by reacting alkylene oxides with mononuclear polyhydroxybenzenes such as resorcinol, pyrogallol, phloroglucinol, hydroquinone, 4,6-di-t-butyl-catechol, catechol, orcinol and other alkylated polyhydroxybenzenes can be used. Likewise, polyoxyalkylene polyols prepared by reacting alkylene oxides with fused ring systems such as 3-hydroxy-2-naphthol, 6,7-dihydroxy-1-naphthol, 2,5-dihydroxy-1-naphthol, 9,10-dihydroxyanthracene, 2,3-dihydroxyphenanthrene and the like can be used.

Polyesters obtained by reacting 1,2-alkylene oxides or mixtures thereof with polynuclear phenols such as the various di-, tri-, and tetraphenol compounds wherein phenols are attached by means of single bonds or by aliphatic hydrocarbon radicals can also be used.

Other useful polyethers include the alkylene oxide adducts of Novolaks. These polyethers are believed to be adducts of mixtures of polynuclear phenols of diphenylmethanes such as 4,4'-dihydroxydiphenylmethane and 2,4'-dihydroxydiphenylmethane formed by the Baeyer reaction between phenol and formaldehyde. Novolaks can be prepared by condensing 1 mole of a phenol, such as phenol, cresol or other alkylphenol with 0.8 mole of an aldehyde such as formaldehyde or furfuraldehyde under acidic conditions at temperatures of about 160° to 170° C. These polynuclear phenols frequently contain four to eight units and can contain 12 or more units. Novolaks are noncurable thermoplastic resins.

Also included are polyethers having nitrogen bridges obtained by reacting one or more of the alkylene oxides described above with ammonia or an acyclic polyamine such as ethylenediamine, propylenediamine, butylenediamine, pentylenediamine, hexylenediamine, octylenediamine, nonylenediamine, decylenediamine; polyalkylene polyamines such as diethylenetriamine, triethylenetriamine, tetraethylene pentamine and the like. A typical polyether is the propylene oxide addition product of diethylenetriamine represented by the formula:

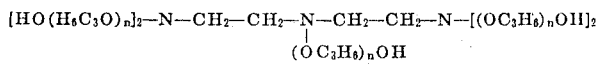

wherein $n$ represents an integer which provides an average molecular weight of 300 or more.

Other useful polyethers include 1,2-alkylene oxide adducts of mononuclear primary amines such as o-, m-, and p-phenylenediamine; 2,4- and 2,6-diaminotoluene; 2,6-diamino-p-xylene; 4,6-diamino-m-xylene, 2,4-diamino-m-xylene; 3,5-diamino-o1xylene; isohexyl-p-phenylemediamine; 3,5-diaminotoluene; and the like; polynuclear and fused aromatic polyamines such as 1,4-naphthylenediamine; 1,5-naphthylenediamine; 1,8-naphthylenediamine; benzidine; toluidine; 4,4'-methylenedianiline; 3,3'-dimethoxy-4,4'-biphenyldiamine; 3,3'-dichloro-4,4'-biphenyldiamine; 3,3'-dimethyl-4,4'-biphenyldiamine; 4,4'-ethylenedianiline; 4,4'-ethylidenedianiline; 1-fluorenamine; 2,5-fluorenediamine; 2,7-fluorenediamine; 1,4-anthradiamine; 3,3'-biphenyldiamine; 3,4-biphenyldiamine; 9,10-diaminophenanthrene; 4,4'-diaminobenzene and the like.

Higher functional mono- and polynuclear polyamines can also be reacted with 1,2-alkylene oxides to obtain useful polyethers. These amines include 2,4,6-triaminotoluene, 2,3,5-triaminotoluene; 5,6-diaminoacenaphthalene, 4,4',4''-methylidynetrianiline, 3,5-diaminobenzoic acid, triaminodiphenyl ethers such as 2,4,4'-triaminodiphenyl ether, 2,3',4-triamino-4'-methoxydiphenyl ether and the like; polyamines obtained by interaction of aromatic monoamines with formaldehyde or other aldehydes, for example:

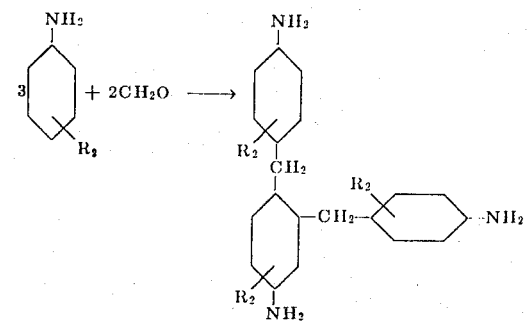

wherein $R^2$ is hydrogen or an alkyl group.

Polyethers having sulfur bridges include the condensation products of thioglycol with itself or with other polyhydric alcohols such as ethylene glycol, diethylene glycol, trimethylolpropane and the like. These polyethers can also be condensed with the aromatic amines and phenols previously described. Other polycondensation products having sulfur and nitrogen bridges include those obtained by reaction of thioglycol with aromatic amines such as xylidene, toluidines or reaction products of these aromatic amines with alkylene oxides such as ethylene oxide, propylene oxide, butylene oxide, their mixtures and the like.

Polyols, that is, alkylene polyols which can be used to form prepolymers include hydroxyl terminated compound having at least two terminal reactive hydroxyl groups such as ethylene glycol, trimethylolpropane, glycerol, butylene glycols, hexylene glycols, pentaerythritol, dipentaerythritol, tripentaerythritol, sorbitol, carbohydrates, sucrose, other sugars and the like, butanetriols, hexanetriols and the like.

Polyesters, which can be used instead of or in conjunction with alkylene polyols or polyethers (polyoxyalkylene polyols) in preparing isocyanate terminated urethane prepolymers, include, for example, those obtained by reacting organic aliphatic, cycloaliphatic or aromatic di- or polycarboxylic acids, or their ester forming derivatives thereof such as anhydrides, acid halides and the like with polyols. These hydroxyl terminated polyesters contain at least two terminal hydroxyl groups. They can also be prepared by known transesterification methods. These polyesters have molecular weights of the order of those of the aforementioned polyoxyalkylene glycols, that is, about 178 to about 5,000 and preferably about 600 to about 4,000.

Acids useful for preparing polyesters include oxalic, maleic, azelaic, itaconic, citraconic, succinic, adipic, suberic, sebacic, o-phthalic, isophthalic, terephthalic, and hexahydroterephthalic acids, their anhydrides and the alkyl unsaturated and halogen substituted derivatives of these acids as well as their homologues. Other useful acids include hydroxy acids containing from 15 to 20 carbon atoms such as hydroxy palmitic acids, hydroxy stearic acids, ricinoleic acid and the like. Dibasic acids including dimer acids such as the dimerized unsaturated acids chosen from the octadecadienoic acids preferably from the 9,12-octadecadienoic acid (linoleic acid) to form dilinoleic acids can be used. The dilinoleic acids can be prepared by the Diels-Alder reaction. Various fats and oils such as castor oil, soybean oil and the like can also be used. Tribasic acids such as propane tricarboxylic acid, higher alkane tricarboxylic acids, benzene tricarboxylic acids, other aromatic tricarboxylic acids, trimeric acids of $C_{18}$ acids, their anhydrides or the like can be used.

Polyols useful in preparing these polyesters include low-molecular weight polyols such as ethylene glycol, diethylene glycol, triethylene glycol, 1,4-butylene glycol, 1,6-hexanediol and their mixtures; glycerol, trimethylolethane, trimethylolpropane, 1,2,6-hexanetriol, pentaerythritol, dipentaerythritol, tripentaerythritol, sorbitol, sucrose and the like as well as their reaction products with alkylene oxides such as ethylene oxide, propylene oxide, butylene oxide, their mixtures and the like.

These polyesters must contain at least two terminal hydroxyl groups. Useful polyesters can be prepared by esterification of from about 2 moles to about 1.02 moles of an alkylene such as ethylene glycol with one mole of a dicarboxylic acid such as oxalic acid. Polyesters having molecular weights of from about 178 to about 5,000 can be used. When polyols having more than two hydroxyl groups or polycarboxylic acids having more than two carboxylic acid groups are used, the resulting polyesters will contain more than two terminal hydroxyl groups.

It is to be understood that the polyol, polyether and polyester prepolymers described above must be terminated with unreacted, i.e., free or reactive isocyanate groups for subsequent reaction with the terminal hydroxyl groups in the Mannich Base condensates, polyol, polyether or polyester, alcohols or the like and that the terminal reactive isocyanate groups are only the reactive groups present in the prepolymer molecule.

III. Interreaction of Mannich Base Condensates with Prepolymers

The isocyanate terminated urethane prepolymers described in section II are interreacted with the Mannich Base condensates described in section I to obtain polyurethane resins useful in the present invention. Prepolymers are interreacted with the Mannich Base condensates in such proportions that all of the reactive, i.e., unreacted or free isocyanate groups in the prepolymer are reacted. When desired, from about 0 to about 1 mole of a hydroxyl terminated compound such as a polyol, polyether, a polyester, a monohydric alcohol or a monohydric phenol can be reacted with the prepolymer and Mannich Base compound provided at least 1 mole of Mannich Base condensate and about 1 mole of prepolymer are present. Further, the reactants should be interreacted in such proportions that a polyurethane resin substantially free of reactive isocyanate groups is obtained.

Useful hydroxyl terminated compounds include the polyols, polyethers and polyesters having at least two terminal hydroxyl groups described in the preceding section. Further, the compounds can be a monohydric compound such as a monohydric alcohol or phenol. For example, hydrophilic alcohols such as methanol, ethanol, 2-methoxyethanol, isopropanol, 2-diethylaminoethanol or the like can be used. Likewise, hydrophobic alcohols such as octyl alcohol, decyl alcohol or the like can be used. Ethoxylates having a terminal hydroxyl group such as the condensation product of 2 moles of ethylene oxide with 1 mole of α-methylbenzlphenol can also be used. Phenols such as phenol, cresols, xylenols, alkylphenols such as amylphenols, octylphenols, diamylphenols, dodecylphenols, dinonylphenols or the like and Mannich condensation products derived from phenols can be used.

Mannich condensation products derived from phenols are the reaction products of (1) at least one primary or secondary amine, (2) at least one aldehyde or aldehyde liberating composition and (3) a phenol having at least one active hydrogen atom present in the phenol nucleus. Useful amines include alkanolamines such as a monoalkanolamine or dialkanolamine wherein the alkylene groups contain at least two carbon atoms. Mannich condensation products derived from phenols are well known and can be prepared by the procedure described in this application as well as by the procedures described in U.S. Pat. No. 2,003,092 - Bruson - Mar. 3, 1936; U.S. Pat. No. 2,114,122- Bruson - Apr. 12, 1938 and U.S. Pat. No. 2,220,834 - Bruson et. al. - Nov. 5, 1940. The Mannich condensation products derived from phenols are used as polyols in this invention and not to provide the same functions as the Mannich Base condensates derived from amino resin bases described in the present invention.

When phenols such as phenol, cresol or the like are reacted with reactive isocyanate groups in prepolymers and the phenols do not contain terminal hydroxyl groups like those present in the above described Mannich condensation products derived from phenol, addition products which are blocked or masked isocyanate prepolymers are obtained. Blocked isocyanate prepolymers have limited thermal stabilities and are stable up to temperatures of about 150° C. On heating above 150° C., the blocked isocyanate prepolymers decompose to regenerate prepolymers having reactive isocyanate groups. The regenerated reactive isocyanate groups then polymerize to form polyurethane resins. It is possible to alkylolate these blocked isocyanate products to obtain alkylolated polyurethane resin treating agents within the scope of this invention. Blocked polyurethane treating agents have the advantage that they undergo further polymerization via isocyanate polymerization during curing at elevated temperatures. Other active hydrogen compounds such as tertiary butanol, acetone oxime, sodium bisulfite, epsilon caprolactam and the like can also be used to prepare blocked isocyanate prepolymers. These compounds are well known in the art. As invert solvent such as xylene, dibutyl ether, monochlorobenzene or the like can be used in the blocking or masking reaction when desired.

Since the polyurethane resins are subsequently alkylolated to obtain treating agents which are used in the treatment of substrates, gelling of the polyurethane resins during their preparation, alkylolation or use should be avoided so that the alkylolated polyurethane treating agents have useful viscosities, solubility characteristics, dispersibility characteristics, other physical properties and the like. Gelation of alkylolated polyurethane treating agents should be avoided because the treating agents are frequently used in the form of solutions or dispersions particularly aqueous solutions or dispersions for the treatment of substrates. Gelation of the alkylolated polyurethane treating agent as well as its intermediate reaction products can be controlled by selection of the ratio in which the terminal hydroxyl groups present in the Mannich Base compounds as well as terminal hydroxyl groups present in any polyols, polyethers, polyesters, monohydric alcohols, monohydric phenols or the like are reacted with reactive isocyanate groups present in the prepolymer.

Generally, to avoid gelation, the ratio of terminal hydroxyl groups to reactive isocyanate groups should be at least 1:1. However, an excess of terminal hydroxyl groups can be present as an excess is not essential to this invention. A ratio of terminal hydroxyl groups to reactive isocyanate groups of 2:1 is particularly useful. For example, in the case of a difunctional prepolymer, that is, a prepolymer containing two reactive isocyanate groups available for reaction with the terminal hydroxyl groups in a Mannich Base condensate having two terminal hydroxyl groups attached to one nitrogen atom is reacted with the prepolymer in a ratio of not less than four terminal hydroxyl groups per two reactive isocyanate groups, that is, not less than 2 moles of the Mannich Base condensates are reacted with 1 mole of the difunctional prepolymer. Likewise, not less than 3 moles of a Mannich Base condensate having two terminal hydroxyl groups are interreacted with 1 mole of a trifunctional prepolymer, that is, a prepolymer having three reactive isocyanate groups to avoid gelation. Additionally, to avoid gelation, at least 4 moles of a Mannich Base condensate having two terminal hydroxyl groups are interreacted with 1 mole of a tetrafunctional prepolymer, that is, a prepolymer having four reactive isocyanate groups.

Where the Mannich Base condensate has four terminal hydroxyl groups, at least 1 mole of the Mannich Base condensate is reacted with a difunctional prepolymer, that is, a prepolymer having two reactive isocyanate groups. When the Mannich Base condensate has six terminal hydroxyl groups, at least 1 mole of the Mannich Base condensate is interreacted with 1 mole of a trifunctional prepolymer, that is, a prepolymer having three reactive isocyanate groups.

In cases where the Mannich Base condensate has only one terminal hydroxyl group as in the case of a compound derived from a monoalkanolamine such as monoethanolamine or N-methyl monoethanolamine, gelation is usually avoided by interreaction of as little as 1 mole of the Mannich Base condensate with each reactive isocyanate group in the prepolymer. For example 2 moles of the Mannich Base condensate, each mole of which contains one terminal hydroxyl group can be interreacted with 1 mole of a difunctional prepolymer having two reactive isocyanate groups. Likewise, 3 moles of this Mannich Base condensate can be interreacted with 1 mole of a trifunctional prepolymer and 4 moles of this Mannich Base condensate can be interreacted with 1 mole of a tetrafunctional prepolymer. It is to be understood that mixtures of Mannich Base condensates having varying numbers of terminal hydroxyl groups can be reacted with mixtures of isocyanate prepolymers having various numbers of reactive isocyanate groups. However, for those applications where it is desireable to avoid gelation, the above mentioned conditions are to be observed.

Polyurethane resins can be prepared by interreaction of Mannich Base condensates and prepolymers for 30 minutes to 6 hours at temperatures of from about 25° to about 160° C. Mannich Base condensates can be interreacted with prepolymers by the following procedure. The required amount of prepolymer is charged into a reactor equipped with agitator and heated with agitation to a temperature of from about 40° to about 80° C. The required amount of Mannich Base condensate is heated in a second reactor to a temperature of from about 40° to about 80° C. If desired, part of the Mannich Base condensate can be replaced by polyol, polyether or polyester provided at least one mole of Mannich Base condensate is present. The heated prepolymer is then slowly added over a period of time from about 15 minutes to about 2 hours to the heated Mannich Base condensate in the second reactor while the reaction temperature is maintained at from about 40° to about 80° C. After addition of tertiary prepolymer is complete, the triethylenediamine, N-methyldicyclohexylamine, heated to a temperature of from about 80° to about 160° C. and maintained tin salts temperature range for about 30 minutes to about 4 hours to complete reaction. The resulting product, which is a polyurethane resin, is cooled to room temperature. Optionally, the Mannich Base condensate and prepolymer can be mixed at 25° C. and interreacted at any temperature up to 160° C. When desired, an inert solvent can be present. These reactions are carried out under anhydrous conditions and usually under a nitrogen blanket.

A catalyst can be used in preparation of the polyurethane resins described in section III. Such catalysts are well known and include compounds such as tertiary amines, for example, triethylamine, triethylenediamine, N-methyldicyclohexylamine, dimethylcyclohexylamine, N,N-diethylcyclohexylamine, cyclohexylpiperidine, diethylaniline, N-ethyl morpholine and the like, lead salt such as lead octoate, lead naphthenate and the like, tin salts such as stannous octoate.

IV. Alkylolation of Polyurethane Resins

Polyurethane treating agents are prepared by alkylolation of the polyurethane resins described in section III above. The polyurethane resins are alkylolated by reaction with from about one to about three moles of an aldehyde or aldehyde liberating composition with at least one reactive hydrogen atom present in the resin. Alkylolation is effected by reacting the aldehyde or aldehyde liberating composition with the resin in these proportions at about 5° to about 110° C. for about 30 minutes to about 10 hours. A solvent such as water, methanol, ethanol, butanol, xylene, their mixtures or the like can be present. The treating agent is usually obtained in the form of a solution or dispersion of the alkylolated polyurethane resin.

Aldehydes or aldehyde liberating compositions which can be used in the alkylolation include aldehydes having from one to seven carbon atoms. For example, formaldehyde can be used in the form of 30 to 40 percent aqueous solutions, 30 to 55 percent alcohol solutions with alcohols such as methanol, n-butanol, i-butanol or the like. Aldehyde liberating compositions such as polymeric forms of formaldehyde such as paraformaldehyde, trioxane, hexamethylene tetramine or the like can be used. Other aldehydes such as acetaldehyde, butyraldehyde, heptaldehyde, furfuraldehyde, chloral, alphaethyl-beta-propylacrolein, benzaldehyde or the like can be used. Other aldehyde liberating compositions such as acetals or the like which will liberate these aldehydes can also be used. Mixtures of the above aldehydes and aldehyde liberating compositions can be used.

V. Formulation of Alkylolated Polyurethane Treating Agents

The alkylolated polyurethane treating agents can be used in the form of compositions of alkylolated polyurethane resins such as solutions or dispersions. For example, the alkylolated polyurethane resins can be reacted with acids to form salts which are soluble or dispersible in water and/or other solvents. These salts can be prepared from inorganic acids such as hydrochloric acid, sulfuric acid, phosphoric acid, nitric acid or the like. They can also be prepared from organic acids containing from one to four carbon atoms such as formic acid, acetic acid, propionic acid, butyric acid, isobutyric acid, succinic acid, maleic acid or the like. These salts are prepared by reacting the acid with the alkylolated polyurethane resin at a temperature of from about 25° to about 120° C. provided these temperatures do no result in decomposition of the resin or its salts. Usually, from about 0 to about 20 percent by weight of said treating agent of an acid containing from one to four carbon atoms is reacted with the reactive tertiary amine groups present in the alkylolated polyurethane resin. When desired, one or all of the reactive tertiary amine groups can be reacted with acid. The salts can be prepared in anhydrous or aqueous systems and solvents can be used. Organic acids which form treating agent salts that disassociate on heating are particularly useful in the preparation of treating agent compositions.

When desired, composition of the alkylolated polyurethane resins or their salts can be formulated with surfactants, cross-linking agents, pigments, solvents or the like. Such compositions are useful in specific applications such as padding, brushing, dipping, spraying, coating or the like.

Surfactants such as nonionic surfactants and cationic surfactants can be used in such compositions. From about 0 to 20 percent by weight of a surfactant based on the weight of the alkylolated polyurethane resin can be used. The surfactant aids in the emulsification and/or dispersion of the resin. Useful surfactants include nonionic surfactants obtained from the reaction of alkylene oxides such as ethylene oxide, propylene oxide, butylene oxide, their mixtures and the like with alkylphenols, fatty acids, alcohols and the like and cationic surfactants such as those obtained from the reaction of alkylene oxides with nitrogen containing hydrophobic compounds and those obtained by quaternization of nitrogen containing compounds. Nonionic surfactants include the condensation product of one mole of nonylphenol and 9 moles of ethylene oxide (nonylphenol + 9 E.0.), the condensation product of 1 mole of tall oil fatty acids and 18 moles of ethylene oxide, the condensation product of 1 mole of tridecyl alcohol (Oxo) and 12 moles of ethylene oxide, lauryldimethylbenzyl ammonium chloride and the like. Other nonionic surfactants include the Pluronics, which are block copolymers consisting of polypropylene oxide and polyethylene oxide blocks, have molecular weights of from about 600 to 100,000 and are polyalkylene glycol ethers. The Tergitol (Union Carbide) surfactants, which are also polyalkylene glycol ethers and have molecular weights of about 1,000 to about 50,000 can also be used. Spans and Tweens such as sorbitan monooleate, sorbitan monolaurate, sorbitan monopalmitate, sorbitan monostearate, sorbitan tristearate, sorbitan trioleate, polyoxyethylene sorbitan monolaurate, polyoxyethylene sorbitan monopalmitate, polyoxyethylene sorbitan monostearate and the like can also be used. Specific products include span 20, span 40, span 60, span 85, tween 40, tween 60 and tween 80.

Anionic surfactants, which can be used alone or in conjunction with the above mentioned nonionic surfactants, include the sodium and potassium sulfonates of alkylbenzenes or alkylnaphthalenes such as sodium sulfonate of dodecylbenzene, sodium sulfonate of hexylnaphthalene, potassium sulfonate of octylnaphthalene and the like; sodium and potassium salts of sulfonates of naphthalenes, alkylnaphthalenes, benzenes and alkylbenzenes condensed with formaldehyde; sodium and potassium sulfates of linear and branched alcohols such as the sodium sulfate of lauryl alcohol, the potassium sulfate of tridecyl alcohol (Oxo), the sodium sulfate of oleyl alcohol and the like; ammonium, sodium and potassium sulfates of alkylene oxide condensates of alkylphenols such as the ammonium sulfate of the condensation product of 1 mole of nonylphenol and 4 moles of ethylene oxide, the sodium sulfate of the condensation product of one mole octylphenol and 3 moles of ethylene oxide and the like; ammonium, sodium and potassium sulfates of alkylene oxide condensates of alcohols such as the sodium sulfate of the condensation product of lauryl alcohol and 4 moles of ethylene oxide, the potassium sulfate of the condensation product of oleyl alcohol and three moles of ethylene oxide and the like; alkyl esters of sodium or potassium sulfosuccinates or the like such as the dihexyl ester of potassium sulfosuccinate and the diethylhexyl ester of sodium sulfosuccinate. The corresponding phosphonate and phosphate esters particularly the free acids of complex phosphate esters can also be used. Useful phosphonates and phosphates include the sodium salt of dodecylbenzene phosphonate, the potassium salt of dodecylphosphate, the sodium phosphate ester of the condensation product of nonylphenol and 6 moles of ethylene oxide or the like. Mixtures of the above nonionic and anionic surfactants as well as mixtures of nonionic and cationic surfactants can be used.

When desired, alkylolated polyurethane resins can be formulated with a solvent. Usually, from about 0 to 99 percent by weight of a solvent based on the weight of alkylolated polyurethane resin is used. The solvent can be present in the resin prior to alkylolation or can be added after alkylolation. Solvents which can be employed in formulating the alkylolated polyurethane treating agents include water, hydrophilic alcohols such as methanol, ethanol, 2-methoxyethanol, isopropanol and the like, hydrophobic alcohols, such as octyl alcohol, decyl alcohol and the like, chlorinated solvents such as chlorinated ethylenes, chlorinated benzenes and the like, hydrocarbon solvents such as petroleum ether, mineral spirits, benzene, toluene, xylenes, alkylnaphthalenes or the like, ketones such as acetone, methyl ethyl ketone or the like, and esters such as ethyl acetate, amyl acetate, methyl butyrate or the like. Mixtures of solvents can also be used.

The alkylolated polyurethane treating agents contain reactive alkylol groups such as methylol groups of the like and can be formulated or used with cross-linking agents. From about 0 to about 1 mole of a cross-linking agent per reactive alkylol group present in the alkylolated polyurethane resin can be used. The cross-linking agent can be incorporated in the composition or applied separately to substrate prior to curing. Useful cross-linking agents include phenols, such as phenol, cresols, xylenols, other alkylphenols, bis phenols and the like, amino resin bases such as urea, thiourea, dicyandiamide, guanidine, guanylurea, biuret, melamine, ammeline, ammelide, cyanuric acid, guanamine as well as their mixtures, derivatives and the like. Likewise, compounds having reactive amino groups such as primary amines, ammonia, polyamines, e.g., diethylenetriamine or the like can be used. Further, the reactive alkylol groups present in the alkylolated polyurethane resin treating agents can also be reacted with reactive groups such as hydroxyl or amine groups present in the substrate or can be interreacted to obtain more highly polymerized polyurethane resins.

The alkylolated polyurethane treating agent compositions disclosed in this invention are useful in the treatment of fibrous materials such as fibers, textiles, plastics, leather, paper and the like substrates. These agents can be used to treat textile materials such as fibers, fabrics and the like. Useful textile materials include those derived from natural, manmade and synthetic fibers such as cotton, wool, silk, jute, sisal, hemp, fur, flax, kapok, rayon, cellulose acetate, cellulose triacetate, polyamides such as nylon, polyesters such as polyethylene terephthalate (Dacron), acrylics such as polyacrylonitrile, vinyl resins such as copolymers of polyvinyl chloride and polyvinyl acetate, copolymers of vinylidene chloride and vinyl chloride, copolymers of acrylonitrile and vinyl chloride or the like, polystyrene, polyethylene, polypropylene, polyurethane, glass, ceramic, asbestos, protein fibers such as vicara and peanut protein blends of these of the like. Blends of these fibers can also be used.

The alkylolated polyurethane resin treating agent compositions can be applied to the textile material by any of the procedures and equipment used in coating or treating fibrous materials, including spraying, padding, dipping, brushing, knife and doctor blades, air blades, roller coatings, curtain coatings, gravure coatings and the like. They can be applied in concentrated forms or in dilute forms such as solutions, emulsions, and the like depending on the type of application. When the treating agent compositions are applied in dilute form, the treated material is dried at about 30° up to about 300° F. The quantity of treating agent composition used can vary from about 0.01 percent by weight to about 3.0 percent by weight based on the weight of the dry fiber. Generally, from about 0.1 percent by weight to about 1.0 percent by weight of the composition based on the weight of dry fiber can be used. If desired, other additives such as stabilizers, antioxidants, thickeners, softeners, lubricants and the like can be added to the compositions provided such additives are compatible with the alkylolated polyurethane resin treating agents which are cationic materials, that is, such additives do not interreact with the agents to form gels, precipitates or the like which adversely affect the effectiveness of the agents or their compositions. The treating agent compositions are particularly useful in the treatment of textiles materials to improve their antistatic properties and the like. Further, the compositions are useful in improving other fiber properties such as lubricity, handle, drape, softness, dyeability, pigment binding, fullness, abrasion resistance, finish, other desirable textile properties and the like.

When compositions of the alkylolated polyurethane resin treating agents of the present invention are used in the coloration and pigmentation of textile materials such as fibers or fabrics, they can be applied by one of the methods described above such as padding, spraying or the like. The amount of treating agent composition which is applied to the fiber will depend on the properties of the fiber as well as the particular application in which the treating agent is being used. If desired, the treating agent composition can be applied to the fiber in a colorless form, i.e., a form of the composition which is free of pigment or dye, cured and subsequently tinted or dyed. The temperature at which the composition is applied is not critical and is usually in the range of from about 20° to about 100° F.

After the alkylolated polyurethane resin treating agent composition is applied as a coating on fiber or textile, the coated fiber or textile is dried at about 30° to about 300° F. and then cured by passage through a curing oven maintained at a temperature of from about 200° to about 450° F. preferably from about 225° to about 425° F. The residence time in the curing oven can vary from about 1 to about 120 minutes and preferably from about 2 to about 5 minutes. The optimum temperature and residence time in the curing oven can readily be determined by placing dried uncured samples of the coated fiber or textile in the oven and heating the samples for given periods of time to determine when satisfactory curing of the coating on the sample occurs. From about 0.1 percent to about 30 percent of the cured treating agent composition based on the weight of the fiber or textile can be used. Usually concentrations of about 1 to about 15 percent by weight of the cured treating agent composition based on the weight of the fiber or textile are preferred.

When compositions of alkylolated polyurethane treating agents are used as pigment binders, the pigment can be dispersed in an aqueous solution or aqueous dispersion of the treating agent composition and the resulting composition is applied to the fiber or textile, dried and cured in the manner described above. The treating agents disclosed in this invention can be used to bind pigments such as C.I. RB 10 carbon black, C.I. RB 31 iron oxide red, C.I. RB 40 phthalocyanine green, C.I. RB 51 chrome orange, C.I. RB 54 molybdate orange, C.I. RB 81 titanium dioxide, C.I. RB 98 cadmium yellow and the like. Other types of pigments can also be used. The concentration of pigment in the treating agent composition used will vary depending on the amount of pigmentation desired and the type of coating. Concentration of pigment can vary from about 0.1 to about 40 percent based on the weight of the alkylolated polyurethane resin present in the treating agent composition.

If desired, a treating agent composition, which is free of pigment, that is, containing 0 percent by weight based on the weight of the alkylolated polyurethane resin, can be used to form colorless coatings on fibers, textiles, paper or like substrates. These colorless coatings are dried, cured in the manner described above and then dyed by conventional methods. Acid dyes such as C.I. Acid Yellow 40 (18,950), C.I. Acid Yellow 116 (Cibalan Yellow GRL), C.I. Acid Yellow 118 (Vialon Fast Yellow G), C.I. Acid Red 114 (Benzyl Red BR), C.I. Acid Red 225 (Vialon Fast Red B), C.I. Acid Red 251 (Cibalan Bordeaux El), C.I. Acid Blue 170 (Cibalan Blue BRL), C.I. Acid Blue 209 (Vialon Fast Blue FFG), C.I. Acid Black 61 (Vialon Fast Blue Grey B) and the like can be used to dye colorless coatings. The concentration of dye used will depend upon the particular strength and shade desired. Concentrations of dye can vary from about 0.01 to about 5 percent based on the weight of fiber with the preferred concentrations being from about 0.01 to about 4 percent based on the weight of fiber. The concentrations of alkylolated polyurethane resin treating agent composition which is employed as a colorless coating on fiber or fabric will be in the same range as those given above for pigment binding.

If desired, metal salts such as basic aluminum acetate, zirconium acetate, Werner-type reactive chromium complexes, e.g., Quilon (duPont) or the like which decompose on heating to form mordants can be incorporated in the treating agent compositions. Such complexes include stearate chromic chloride and other complex compounds such as those described in U.S. Pat. No. 2,273,040 granted Feb. 17, 1942. These compositions can be applied to textiles or fibers, dried and cured to form coatings which contain mordants. The presence of these mordants in the cured coatings greatly facilitates dyeing with dyestuffs such as acid dyestuffs and the like. These complexes can be applied from aqueous solutions in concentrations of from about 1 to about 5 percent by weight based on the weight of fiber with the preferred concentration being about 2 to about 4 percent based on the weight of fiber.

Alkylolated polyurethane resin treating agent compositions are also useful in improving antistatic properties and abrasion resistance of fibers and fabrics. The compositions are applied as coatings to fibers or textiles, dried and cured in the same manner as the pigment binding and dyeing applications described above. Fibers and textiles treated with these treating agents exhibit improved antistatic properties.

Alkylolated polyurethane resin treating agent compositions are also useful as an auxiliary in retanning of chrome stock and in the finishing of leather. They can also be used to impregnate or coat leather. The treating agent compositions can be used in the form of compositions containing about 0.1 to about 30 percent by weight of the treating agent composition based on the weight of leather and can be prepared by diluting the treating agent compositions with a solvent such as alcohol or alcohol and water mixtures. Compositions of the treating agents can be used to retan leather as well as to impregnate, coat and condition leather that has previously been fatliquored. Excellent penetration of the leather is obtained with the treating agent compositions and there is no evidence of tackiness after the treated leather has been dried. The compositions can be applied to leather as spray coatings, curtain coatings or by drum applications. Chrome tanned leather as well as vegetable tanned leather can be treated with these agents.

Alkylolated polyurethane resin treating agent compositions can also be used in paper making. Alkylolated polyurethane resin treating agent compositions can be added directly to the beater in paper making and the alkalinity of the pulp and the beater raised so that the treating agent condenses with the hydroxyl group present in the cellulose. The compositions can also be used to impregnate or coat paper. Paper prepared by the processes described above has increased strength and water resistance. Thus, alkylolated polyurethane resin treating agents compositions, which contain cross-linking agents can be used to coat paper to improve properties such as strength, water resistance and the like. Further, the cationic properties of the alkylolated polyurethane composition make them useful as flocculating agents in paper making as well as in water treatment.

For a fuller understanding of the nature and objects of this invention, reference may be made to the following examples which are given merely to illustrate the invention and are not to be construed in a limiting sense. All weights, proportions and percentages are by weight unless otherwise indicated. Likewise, all references to temperature are degrees C. unless otherwise indicated.

EXAMPLE 1

Preparation of a Mannich Base condensate from a dialkanolamine, an aldehyde and an amino resin base.

315 grams (3 moles) of diethanolamine, 200 g. of water and 100 g. of methanol were charged into a glass flask equipped with agitator, reflux condenser and provisions for external heating and cooling. The charge was cooled with agitation to 10° C. A mixture of 244.5 g. (3 moles) of aqueous formaldehyde solution (37 percent active) and 150 g. of water was added slowly to the charge over 60 minutes while the charge was agitated and maintained at 10° C. during the formaldehyde mixture addition. The resulting reaction mixture was agitated at 10° C. for an additional 45 minutes to form the methylol adduct of diethanolamine (hydroxymethyl diethanolamine).

Two hundred and fifty two grams (3 moles) of dicyanodiamide in finely divided form was added with vigorous agitation to the water-methanol solution of the methylol adduct of diethanolamine. The resulting reaction mixture was heated to 90°–95 C. with agitation and then refluxed at 90°–95+C. with agitation for about 1 hour to complete the Mannich reaction.

The Mannich reaction product was a solution of the desired Mannich Base condensate, that is, a water-methanol solution of the reaction product of one mole of diethanolamine, one mole of formaldehyde and one mole of dicyanodiamide dissolved in a water and methanol mixture. The solution of Mannich Base condensate was vacuum distilled under a vacuum of 28 inches or higher to remove water, methanol and other volatiles and to recover the Mannich Base condensate in substantially anhydrous form. Vacuum distillation was continued with heating until the pot temperature was 100° C. The Mannich Base was then heated at 100° C. for about 15 minutes under vacuum and cooled under vacuum to 55° C. Then the vacuum was released. 100 g. of methanol was added to the Mannich Base condensate. The resulting mixture was vacuum distilled until a pot temperature of 100° C. at a vacuum of 29 inches or more was reached and then heated at 100° C. under vacuum for about 30 minutes to remove methanol and other volatile materials from the Mannich Base condensate. The resulting Mannich Base condensate contained 0.08 percent water by weight (Karl Fischer) and is believed to have the idealized structure of the reaction product shown in Reaction (IV) above.

EXAMPLE II

Preparation of a Mannich Base condensate by reaction of a dialkanolamine, aldehyde and an amino resin base followed by condensation with additional aldehyde.

Three hundred fifteen grams (3 moles) of diethanolamine and 112.5 g. of water were charged into a glass flask equipped with agitator, reflux condenser and provisions for external heating and cooling. The charge was agitated and cooled to about 8° to 10° C. and a solution containing 244.5 g. (3 moles) of aqueous formaldehyde (37 percent active) and 150 g. of water adjusted to an as is pH of 8.3±0.1 was added to the charge over 1 hour. The charge was agitated vigorously and maintained at about 10° C. during addition of the formaldehyde solution. The resulting reaction mixture was agitated at 10° C. for an additional 20 minutes to form the methylol adduct of diethanolamine.

Eighty-four grams (1 mole) of dicyanodiamide in finely divided form was added with vigorous agitation to the water-methanol solution of the methylol adduct of diethanolamine. The resulting reaction mixture was heated to 60°–65° C. with agitation and then reacted at 60°–65° C. with agitation for about 1 hour. 41 g. (0.5 mole) of aqueous formaldehyde solution (37 percent active) was then added to the reaction mixture and the mixture heated to 90°–100° C. and held at 90°–100b$L$ C. For two hours to complete reaction. The resulting reaction product was a formaldehyde condensate of a Mannich Base condensate, that is, the condensation product of about 1 mole of formaldehyde with about 2 moles of a Mannich Base condensate obtained by reacting 3 moles of diethanolamine, 3 moles of formaldehyde and 1 mole of dicyanodiamide dissolved in a water and methanol mixture. The formaldehyde condensate was a Mannich Base condensate.

The resulting methanol and water solution of the Mannich Base condensate was vacuum distilled under a vacuum of 28 inches or higher to remove water, methanol and other volatiles and to recover the Mannich Base condensate in substantially anhydrous form. Vacuum distillation was continued with heating until a pot temperature of 100° C. was reached. The Mannich Base condensate was then heated at 100° C. under vacuum for about 30 minutes and cooled under vacuum to 65° C. Then the vacuum was released. 100 g. of methanol was added to the Mannich Base condensate. The resulting mixture was vacuum distilled until a pot temperature of 100°–102° C. at a vacuum of 28 inches or more was reached. The mixture was then heated at 100°–102° C. under vacuum for about 1 hour to remove methanol and other volatile materials from the Mannich Base condensate.

The resulting Mannich Base condensate contained 0.38 percent water by weight (Karl Fischer) and is believed to have the idealized structure shown in Formula (V) above. The Mannich Base condensate was water soluble. A 5 percent by weight solution of the Mannich Base condensate had a pH of 10.3.

EXAMPLE III

A. Preparation of an isocyanate terminated urethane prepolymer.

All reactants were used in anhydrous form and a nitrogen blanket used to maintain anhydrous conditions during the preparation. 1,500 g. (1.5 mole) of a polyethylene glycol having an average molecular weight of 1,000 was charged into a glass flask equipped with agitator, reflux condenser and provisions for external heating and cooling as well as for maintaining a nitrogen blanket over the reactants to provide anhydrous conditions during reaction. The polyethylene glycol was a waxy solid. It was necessary to heat the glycol to a temperature slightly above its melting point to melt the glycol and then to cool the liquid glycol to about 45° C. 0.6 g. of methyl diethanolamine was then added to the liquid glycol.

Five hundred and twenty two grams (3 moles) of tolylene diisocyanate was then added to the glycol mixture. The glycol mixture was agitated vigorously during the diisocyanate addition. After the addition was complete, the reaction mixture was heated to 70°–75° C. with agitation and reacted for 45 minutes under these conditions to obtain an isocyanate terminated prepolymer having a reactive isocyanate content of 6.2 percent by weight.

B. Preparation of the reaction product of a Mannich Base condensate and an isocyanate terminated urethane prepolymer.

Two hundred and one grams of the Mannich Base condensate obtained in example I above and 700 g. of the isocyanate terminated prepolymer obtained in part (A) above of example III were mixed under anhydrous conditions and under a nitrogen blanket. The reactants were heated to 70°–75° C. with agitation and were reacted at 70°–75° C. for about 2 hours to complete reaction. The resulting reaction product of the Mannich Base condensate and the isocyanate terminated urethane prepolymer was substantially completely reacted and did not contain reactive isocyanate groups.

C. Preparation of a composition of an alkylolated polyurethane resin treating agent obtained by condensation of formaldehyde with the reaction product of the Mannich Base condensate and the isocyanate terminated urethane prepolymer.

To the reaction product of the Mannich Base condensate and the isocyanate terminated urethane prepolymer obtained in part (B) above was added 244 g. (3 moles) of aqueous formaldehyde solution (37 percent active) and the reaction product was methylolated by heating the methylolation mixture to 70°–75° C. and reacting the mixture at 70°–75° C. for about 1 hour to complete reaction. The reaction product, which was the methylolated reaction product of the Mannich Base condensate and the isocyanate terminated urethane prepolymer, was the desired alkylolated polyurethane resin treating agent.

The treating agent produced a uniform composition in the form of an aqueous solution when mixed with 830 g. of distilled water. When the composition was diluted with additional distilled water, the composition became hazy or cloudy and the solubility of the methylolated polyurethane resin treating agent appeared to decease at higher dilutions.

EXAMPLE IV

The methylolated polyurethane resin treating agent obtained in Part (C) of Example III above was reacted with 60 g. of glacial acetic acid to obtain an acetate salt before dilution with water. 777 g. of distilled water was then added to the acetate salt to obtain an aqueous composition in the form of a solution of the treating agent. The acetate salt of the methylolated polyurethane resin treating agent appeared to be completely soluble in water at all proportions.

EXAMPLE V

A. Preparation of an isocyanate terminated urethane prepolymer.

All reactants were in anhydrous form and a nitrogen blanket used to maintain anhydrous conditions during the preparation. 1,463.4 g. (1.5 moles) of a polypropylene glycol having an average molecular weight of 1,010 having a hydroxyl value of 115 was charged into a glass flask equipped with agitator, reflux condenser and provisions for external heating and cooling as well as for maintaining a nitrogen blanket over the reactants to provide anhydrous conditions during reaction. The proplylene glycol was heated to about 45° C. 0.6 g. of methyl diethanolamine was added to the glycol and the resulting mixture heated to 70° C.

Five hundred and twenty two grams (3 moles) of tolylene diisocyanate was then added over 1 hour to the heated glycol mixture. The glycol mixture was agitated vigorously during the addition. After the addition was complete, the reaction mixture was heated to 70°–72° C. with agitation and reacted at 70°–72 C. for 1 hour to obtain an isocyanate terminated prepolymer having a reactive isocyanate content of 6.4 percent by weight.

B. Preparation of the reaction product of a Mannich Base condensate and an isocyanate terminated urethane prepolymer.

Four hundred and two grams of the Mannich Base condensate obtained in example I above and 1,286 g. of the isocyanate terminated prepolymer obtained in part (A) above of example V were mixed under anhydrous conditions and under a nitrogen blanket. The reactants were heated to 70° C. ±2 with agitation and were reacted at 70° C. ±2 for about 1 hour to complete reaction. The resulting reaction product of the Mannich Base condensate and the isocyanate terminated urethane prepolymer did not contain reactive isocyanate groups.

C. Preparation of an alkylolated polyurethane resin treating agent by condensation of formaldehyde with the reaction product of the Mannich Base condensate and the isocyanate terminated urethane prepolymer and its use in a treating agent composition.

To the reaction product of the Mannich Base condensate and the isocyanate terminated urethane prepolymer obtained in part (B) above was added 488 g. (6 moles) of aqueous formaldehyde solution (37 percent active) and the reaction product was methylolated by heating the methylolation mixture to 60°–70° C. and reacting at 60°–70° C. for about 1 hour to complete reaction. The reaction product, which was the methylolated reaction product of the Mannich Base condensate and the isocyanate terminated urethane prepolymer, was the desired alkylolated polyurethane resin treating agent. The treating agent was mixed with 1,000 g. of isopropanol (⅓⅓ percent) and then 100 g. of a nonionic surfactant (nonylphenol + 9 E.O.) and 120 g. of glacial acetic acid were added and blended until a uniform composition was obtained. The treating agent in the composition was in the form of a cationic salt derivative (acetate) having reactive methylol groups which can be cured by heat.

EXAMPLE VI

Use of an alkylolated polyurethane resin treating agent composition in the treatment of fabric.

Ten grams of the composition of the alkylolated polyurethane resin treating agent described in part (C) of example V above was mixed with 90 G. of water to prepare a padding bath. Cotton fabric was padded in the bath by passing the fabric through a threading of one dip and one nip on a Butterworth Padding Machine using 20 lb. roll pressure. A wet pickup of about 100 percent based on the weight of the fabric was obtained with the bath. The treated fabric was then heated at 325° F. for 10 minutes to cure the treating agent composition in place of the fabric.

The cured treated cotton fabric was then wet back with 300 c.c. of water and 36 c.c. of a 1 percent by weight solution of C.I. Acid Blue 170 (Cibalan Blue BRL 200 percent) was then added to form a dye bath. The dye bath was heated to 60° C. and the fabric was processed for 20 minutes at 60° C. Then the temperature of the bath was increased 80° C. and the fabric was processed for 30 minutes to complete dyeing. The dyed fabric was washed repeatedly in 60° C. water; the water was clear. The same procedure was used to dye untreated cotton fabric. The dried dyed fabric was a deep shade of marine blue whereas the untreated cotton fabric did not shown any affinity for the same dye when dyed under comparable conditions.

EXAMPLE VII

Use of a treating agent composition in the treatment of paper.

A 5 percent by weight aqueous composition of treating agent was prepared by diluting the composition of the methylolated polyurethane treating agent obtained in part (C) of example V above with water. Bleached kraft sheets (36 lbs. basis weight) were impregnated with the 5 percent by weight aqueous composition of treating agent and the excess composition was removed by squeeze roll. The treated kraft sheets was then oven dried at 100° C. for 10 minutes to cure the treating agent composition in place in the paper. The cured treated kraft sheets were compared with untreated kraft sheets by determining the Mullen burst strength (pounds per square inch- average of four determinations). The Mullen burst strength test was performed according to TAPPI Standard Test No. T403–TS 63. The average Mullen burst strength for the cured treated sheets was 13.4 lbs./sq. in. as compared to 10.5 lbs./sq. in. for the untreated sheets. This increase in represented dry strength increase of 27 percent for cured treated sheets.

A cured treated sheet and an untreated sheet were dip dyed using a dilute aqueous solution of C.I. Acid Red 114 (Benzyl Red BR-CIBA). The dip dyed cured treated sheet had a higher affinity for the dye than the untreated sheet and showed a considerably higher color value.

EXAMPLE VIII

Use of a treating agent composition as an auxiliary in retanning of chrome stock.

The following samples of chrome tanned leather stock were prepared:

a. chrome stock fat liquored with 5 percent by weight of a sperm, cocoanut and neatsfoot sulfated oil.
b. chrome stock retanned with 5 percent by weight of a sulfonated and condensed phenolic type syntan and then fat liquored with 5 percent by weight of a sperm, cocoanut and neatsfoot sulfated oil.
c. chrome stock retanned with 5 percent by weight of a sulfonated and condensed phenolic type syntan and 5 percent by weight of the composition of the methylolated polyurethane treating agent obtained in part (C) of example III above and then fat liquored with 5 percent by weight of a sperm, cocoanut and neatsfoot sulfated oil.

Samples (a), (b) and (c) were prepared in the following manner. Each sample was rewet for 30 minutes in a 200 percent float at 100° F., then drained and 1 percent of sodium formate in a 100 percent float at 100° F. was added. The samples were run with the sodium formate float at a pH of 3.9 for 30 minutes and drained. Each was then washed for 10 minutes at 100° F. in a long float and then drained.

Samples (b) and (c) respectively were run for 45 minutes at a pH of 3.7 in 5 percent of a sulfonated and condensed phenolic type syntan in a 100 percent float at 100° F. The treated samples were washed for 10 minutes at 100° F. in a long float and drained.

Sample (c) was run for 45 minutes at a pH of 4.3 in 5 percent by weight of the treating agent composition obtained in part (C) of example III above in a 100 percent float at 100° F. The sample was given a 10 minute wash at 120° F. in a long float and drained.

Samples (a), (b) and (c) respectively were then fat liquored with 5 percent by weight of a sperm, cocoanut and neatsfoot sulfated oil in a 100 percent float at 120° F. for 45 minutes. The treating agent composition obtained in part (C) of example III took up quickly to full exhaust on sample (C) of the chrome stock retanned by the sulfonated and condensed phenolic type syntan and fat liquor takeup on sample (C) was also faster than in the control test.

Evaluation of the samples after treatment showed that sample (a) was a flat leather; sample (b) was a full and soft leather and sample (c) was a leather having fullness and a firm hand with an overall good break.

EXAMPLE IX

Preparation of a Mannich Base condensate by reaction of methylethanolamine, formaldehyde and lauroguanamine. 300 g. of methylmonoethanolamine and 80 g. of methanol were charged into a glass flask equipped with agitator, reflux condenser and provisions for external heating and cooling. The charge was cooled with agitation to 10° C. 326 g. of aqueous formaldehyde solution (37 percent active) was added slowly to the charge over about 2.5 hours while the charge was agitated and maintained at about 10° to 15° C. The resulting reaction product was the methylol adduct of methyl-monoethanolamine.

Two hundred and sixty five grams of lauroguanamine (Olin Mathieson Chemical Corp.) and 800 g. of methanol were charged to a glass flask equipped as described above. The charge was heated with agitation to about 50° C. to obtain a clear solution. The methylol adduct of methyl-monoethanolamine was added to the lauroguanamine charge; the resulting reaction mixture heated with agitation to about 70° C. and reacted at 70° C. with agitation for about 1 hour to complete the Mannich condensation reaction. A water methanol solution of the Mannich condensate was obtained. The solution of the Mannich Base condensate was vacuum distilled to remove water, methanol and other volatiles and to recover the Mannich Base condensate in substantially anhydrous form. The Mannich Base condensate was vacuum distilled under a vacuum of 28 inches or higher until a pot temperature of 100° C. was reached. Vacuum distillation was continued an additional 15 minutes after the pot temperature of 100° C. was reached. The Mannich Base condensate was then cooled to 50° C.; 100 g. of methanol was added and the resulting mixture vacuum distilled to obtain a Mannich Base condensate which contained 0.05 percent by weight of water (Karl Fischer).

EXAMPLE X

Preparation of a Mannich Base condensate by reaction of N-methyl-ethanolamine, formaldehyde and guanidine carbonate. 320 g. of N-methylmono-ethanolamine and 80 g. of methanol were charged into a glass flask equipped with agitator, reflux condenser and provisions for external heating and cooling. The charge was cooled with agitation to 10° C. 326 g. of aqueous formaldehyde solution (37% active) was added slowly to the charge over about 1.5 hours while the charge was agitated and maintained at about 10° C. The resulting reaction product was the methylol adduct of N-methylmono-ethanolamine.

One hundred and eighty grams of guanidine carbonate dissolved in 300 g. of distilled water was charged to a glass flask equipped as described above and the methylol adduct obtained above added to the carbonate with vigorous agitation. The resulting reaction mixture heated with agitation to about 70° C. and reacted at 70° C. with agitation for about ½ hour to complete the Mannich condensation reaction. A water methanol solution of the Mannich condensate was obtained. The solution of the Mannich Base condensate was vacuum distilled to remove water, methanol and other volatiles and to recover the Mannich Base condensate in substantially anhydrous form. The Mannich Base condensate was vacuum distilled under a vacuum of 28 inches or higher until a pot temperature of 100° C. was reached. Vacuum distillation was continued an additional 15 minutes after the pot temperature of 100° C. was reached. The Mannich Base condensate was then cooled to 60° C.; 50 g. of methanol was added and the resulting mixture was vacuum distilled to obtain the light tan Mannich Base condensate in substantially anhydrous form.

EXAMPLE XI

Use of a treating agent composition as a pigment binder.

A padding bath containing 15 g. of the treating agent composition of example III (C) above, 82 g. of distilled water, 2 g. of Pigment Blue 15 (74,160/74,250) and 1 g. of a 10 percent by weight aqueous oxalic acid solution was prepared. The pigment was Unisperse Blue 4G Paste (CIBA Corp.). Cotton fabric was padded with the bath by passing the fabric through a threading of one dip and one nip on a Butterworth Padding Machine using 20 lb. roll pressure. The padded fabric was air dried at room temperature and then cured in an oven at 325° F. for 10 minutes to obtain a pigmented fabric wherein the pigment was bonded to the fabric by the cured treating agent composition.

EXAMPLE XII

A. Preparation of an isocyanate terminated urethane prepolymer.

All reactants were used in anhydrous form and a nitrogen blanket was used to maintain anhydrous conditions during the preparation. 1,508.8 g. of polyethylene glycol having a hydroxyl number of 185.9 was melted and charged into a glass flask equipped with agitator, reflux condenser, thermometer and provisions for maintaining a nitrogen blanket over the reactants to provide anhydrous conditions during reaction. The glycol charge was heated to 70° C. and 870 g. of tolylene diisocyanate was added to the glycol charge over about 2 hours while the reaction temperature was maintained at about 68° to about 72° C. The reaction mixture was agitated vigorously during the diisocyanate addition. After the diisocyanate addition was complete, the reaction mixture was reacted for an additional hour at 68° to 72° C. to obtain an isocyanate terminated urethane prepolymer having a reactive isocyanate content of 8.6 percent by weight.

B. Preparation of an alkylolated polyurethane treating agent composition.

40.2 grams of the Mannich Base condensate obtained in example I above and 99.3 g. of the isocyanate terminated urethane prepolymer obtained in example X (A) above were mixed under anhydrous conditions and under a nitrogen blanket. An exothermic reaction occurred during mixing and the temperature of the reaction mixture rose to about 60° C. The reaction mixture was then heated from 85° to about 95° C. and reacted at these temperatures for about one hour to complete reaction. The resulting reaction product of the Mannich Base condensate and isocyanate terminated urethane prepolymer was substantially completely reacted and did not contain reactive isocyanate groups.

The reaction product was cooled to 70° C.; 48.6 g. of aqueous formaldehyde solution (37 percent active) was added over 30 minutes to the reaction product and the reaction product methylolated by heating the mixture at 65° to 75° C. for 2 hours. The methylolated reaction product was then diluted with 127 g. of water to obtain a treating agent composition containing 50 percent by weight of the methylolated polyurethane treating agent.

C. Use of a treating agent composition as a pigment binder.

A padding bath containing 20 g. of the treating agent composition of example X (B) above, 7 g. of a 10 percent by weight aqueous glacial acetic acid solution, 4 g. of isopropanol, 1 g. of a 10 percent by weight aqueous oxalic acid solution, 2 g. of Pigment Blue 15 (74,160/74,250) and 66 g. of distilled water was prepared. Cotton fabric was padded with the bath by passing the fabric through a threading of one dip and one nip on a Butterworth Padding Machine using 20 lb. roll pressure. The padded fabric was dried in an oven at 225° F. and then cured in an oven at 325° F. for 10 minutes to obtain a pigmented fabric wherein the pigment was bonded to the fabric by the cured treating agent composition. The pigmented fabric had good washfast properties.

What is claimed is:
1. A composition for treating leather which comprises
  1. a treating agent comprising the reaction product of
    A. a Mannich Base condensate which is the reaction product of
      1. at least one amine resin base selected from the group consisting of: dicyandiamide; guanidine; guanylurea; urea; thiourea; biuret; melamine; ammeline; ammelide; cyanuric acid; guanamine; and derivatives thereof having at least one reactive hydrogen atom per molecule,
      2. at least one aldehyde selected from the group consisting of: an aldehyde having from one to seven carbon atoms; and a composition liberating an aldehyde having from one to seven carbon atoms,
      3. at least one alkanolamine selected from the group consisting of a monoalkanolamine and a dialkanolamine wherein the alkylene group of said alkanolamine has from two to four carbon atoms and wherein about 1 mole of (1), at least 1 mole of (2) and at least 1 mole of (3), said (2) and (3) being present in equimolar amounts, are reacted together for about 2 to about 10 hours at from about 5° to about 110° C. to obtain said (A), B. a prepolymer which is the reaction product of an organic polyisocyanate nd at least one member selected from the group consisting of a polyoxyalkylene polyol and a polyester having at least two terminal hydroxyl groups, wherein said polyisocyanate and said member having terminal hydroxyl groups are reacted in a NCO/OH ratio of at least 1.1:1 under anhydrous conditions at from about 50° to about 100° C. to obtain said (B) having at least one reactive NCO group.

wherein said (A) and (B) are reacted under anhydrous conditions and in the absence of a blowing agent at an NCO/OH ratio of from about 1:2 to about 1:1 for about ½ to about 6 hours at from about 25° to about 160° C. to obtain said reaction product of (A) and (B), said reaction product characterized by being capable of forming salts with acetic acid which are at least water dispersible, and C. at least one aldehyde selected from the group consisting of an aldehyde and an aldehyde liberating composition in an amount sufficient to react with at least one of the available reactive hydrogen atoms present in said (A) and in said reaction product of (A) and (B) with the proviso that where aldehyde is so reacted, said reaction is conducted at from about 5° to about 110° C. for abut 1 to about 20 hours to form alkylol groups, II. from 0 to about 20 percent by weight of said treating agent of an acid containing from one to four carbon atoms, III. from 0 to about 99 percent by weight of said treating agent of a solvent selected from the group consisting of water, alcohols, chlorinated hydrocarbons and aromatic hydrocarbons, and IV an anionic tanning agent present in an amount up to about 99 percent by weight of said treating agent.

2. The composition of claim 1 wherein said treating agent is the reaction product of a Mannich Base condensate which is the reaction product of an amino resin base having from one to six reactive hydrogen atoms in the nucleus, at least one aldehyde selected from the group consisting of an aldehyde and an aldehyde liberating composition thereof, and an alkanolamine selected from the group consisting of a monoalkanolamine and a dialkanolamine wherein the alkylene group of said alkanolamine has at least two carbon atoms and a prepolymer, said reaction product of the Mannich Base condensate and the prepolymer further reacted with at least one aldehyde selected from the group consisting of an aldehyde and an aldehyde liberating composition thereof in an amount sufficient to react with at least one of the available reactive hydrogen atoms present in said treating agent.

3. The composition of claim 1 wherein said treating agent is the reaction product of a Mannich Base condensate which is the reaction product of an amino resin base having from one to six reactive hydrogen atoms in the nucleus, at least one aldehyde selected from the group consisting of an aldehyde and an aldehyde liberating composition thereof, and an alkanolamine selected from the group consisting of a monoalkanolamine and a dialkanolamine wherein the alkylene group of said alkanolamine has at least two carbon atoms and a prepolymer, said reaction product of the Mannich Base condensate and the prepolymer further reacted with at least one member of the group consisting of an aldehyde and an aldehyde liberating composition.

4. A composition which comprises

I. a treating agent comprising the reaction product of

A. A Mannich Base condensate which is the reaction product of 1. at least one amino resin base selected from the group consisting of: dicyandiamide; quanidine; guanylurea; urea; thiourea; biuret; melamine; ammeline; ammelide; cyanuric acid; guanamine; and derivatives thereof having at least one reactive hydrogen atom per molecule, 2. at least one aldehyde selected from the group consisting of: an aldehyde having from one to seven carbon atoms; and a composition liberating an aldehyde having from one to seven carbon atoms, 3. at least one alkanolamine selected from the group consisting of: sorbitan monolaurate, polyoxyethylene sorbitan monopalmitate, polyoxyethylene sorbitan monstearate and the like can also be used. Specific products include span 20, wherein about 1 mole of (1), at least 1 mole of (2), and at least 1 mole of (3), said (2) and (3) being present in equimolar amounts, are reacted together for from about 2 to about 10 hours at from about 5° to about 110° C. to obtain said (A), B. a prepolymer which is the reaction product of an organic polyisocyanate and at least one member selected from the group consisting of: a polyoxyalkylene polyol having a molecular weight of from 300 to 5,000; and a polyester having at least two terminal hydroxyl groups and a molecular weight of from 300 to 5,000; wherein said polyisocyanate and said member having terminal hydroxyl groups are reacted in an NCO/OH ratio of at least 1.1:1 under anhydrous conditions at from about 50° to about 100° C. to obtain said (B) having at least one reactive NCO group, wherein said (A) and (B) are reacted under anhydrous conditions and in the absence of a blowing agent at an NCO/OH ratio of from about 1:2 to about 1:1 for about one-half to about 6 hours at about 25° C. to about 160° C. to obtain said reaction product of (A) and (B), said reaction product characterized by being capable of forming salts with acetic acid which are at least water dispersible, and C. at least one aldehyde selected from the group consisting of: an aldehyde having from one to seven carbon atoms; and a composition liberating an aldehyde having from one to seven carbon atoms; in an amount sufficient to react with at least one of the available reactive hydrogen atoms present in said (A) and in said reaction product of (A) and (B) with the proviso that where said aldehyde is so reacted, said reaction is conducted at from about 5° to about 110° C. for about 1 to about 20 hours to form alkylol groups, where II. from about 0 to about 20 percent by weight of said treating agent of an acid containing from one to four carbon atoms, III. from about 0 to about 20 percent by weight of said treating agent of a surfactant, IV. from about 0 to about 80 percent by weight of said treating agent of a pigment, and V. from about 0 to about 99 percent by weight of said treating agent of a solvent selected from the group consisting of: water; alcohols; chlorinated hydrocarbons; and aromatic hydrocarbons.

5. The composition of claim 4 wherein from about 1 to 6 moles of said aldehyde and said alkanolamine, present in approximately equimolar with respect to each other, are condensed with about one mole of said amino resin base.

6. The composition of claim 4 wherein said organic polyisocyanate is tolylene diisocyanate.

7. The composition of claim 4 wherein said polyoxyalkylene glycol is a polyoxyethylene glycol.

8. The composition of claim 4 wherein said polyoxyalkylene glycol is a polyoxypropylene glycol.

9. The composition of claim 4 wherein said alkanolamine is formaldehyde.

10. The composition of claim 4 wherein said alkanolamine is diethanolamine.

11. The composition of claim 4 wherein said aldehyde is formaldehyde.

12. The composition of claim 4 wherein said amino resin base is dicyandiamide.

13. The composition of claim 4 wherein said (A) Mannich Base condensate is further reacted with at least one aldehyde selected from the group consisting of an aldehyde having from one to seven carbon atoms and an aldehyde liberating composition thereof in an amount sufficient to react with at least one of the available reactive hydrogen atoms present in said amino resin base, and then is reacted with said (B) prepolymer.

14. The composition of claim 4 wherein said (A) Mannich Base condensate is reacted with said (B) prepolymer, said reaction product of (A) and (B) is further reacted with at least one aldehyde selected from the group consisting of an aldehyde having from one to seven carbon atoms and an aldehyde liberating composition thereof in an amount sufficient to react with at least one of the available reactive hydrogen atoms present in said reaction product of (A) and (B).

15. The composition of claim 14 wherein from about 1 to 6 moles of said aldehyde and alkanolamine, present in equimolar amounts with respect to each other, are condensed with about 1 mole of said amino resin base.

16. The composition of claim 14 wherein said organic polyisocyanate is tolylene diisocyanate.

17. The composition of claim 14 wherein said polyoxyalkylene glycol is a polyoxyethylene glycol.

18. The composition of claim 1 wherein said polyoxyalkylene glycol is polyotypropylene glycol.

19. The composition of claim 14 wherein said alkanolamine is monoethanolamine.

20. The composition of claim 14 wherein said alkanolamine is diethanolamine.

21. The composition of claim 14 wherein said aldehyde is formaldehyde.

22. The composition of claim 4 wherein said (A) Mannich Base condensate is further reacted with at least one aldehyde selected from the group consisting of an aldehyde having from one to seven carbon atoms and an aldehyde liberating composition thereof in an amount sufficient to react with at least one of the available reactive hydrogen atoms present in said amino resin base and said (B) prepolymer is reacted to form a reaction product of (A) and (B), and said reaction product of (A) and (B) is further reacted with at least one aldehyde selected from the group consisting of an aldehyde having from one to seven carbon atoms and an aldehyde liberating composition thereof in an amount sufficient to react with at least one of the available reactive hydrogen atoms present in said reaction product of (A) and (B).

23. A process for preparing a composition which comprises
A. reacting together to form a treating agent, a Mannich Base condensate and a prepolymer having at least one unreacted isocyanate group under anhydrous conditions and in the absence of a blowing agent at an NCO/OH ratio of from about 1:2 to about 1:1 for about ½ to about 6 hours at about 25° to about 160° C., said Mannich Base condensate being the reaction product of
1. 1 mole of at least one amino resin base selected from the group consisting of: dicyandiamide, guanidine; guanylurea; urea; thiourea; biuret; melamine; ammeline; ammelide; cyanuric acid; guanamine; and derivatives thereof having at least one reactive hydrogen atom per molecule,
2. at least 1 mole of at least one aldehyde selected from the group consisting of: an aldehyde having from one to seven carbon atoms; and a composition liberating an aldehyde from one to seven carbon atoms; and
3. at least 1 mole of at least one alaknol-amine selected from the group consisting of a monoalkanolamine and a dialkanolamine wherein the alkylene group of said alkanolamine has from 2 to 4 carbon atoms,
wherein said (1), (2) and (3) are reacted together for from about 2 to about 10 hours at about 5° to about 110° C., said (2) and (3) being present in equimolar amounts, and said prepolymer being the reaction product of an organic polyisocyanate and at least one member selected from the group consisting of a polyoxyalkylene polyol and a polyester having at least two terminal hydroxyl groups, wherein said polyisocyanate and said member having terminal hydroxyl groups are reacted in an NCO/OH ratio of at least 1.1:1 under anhydrous conditions at from about 50° to about 100° C. to obtain said prepolymer, said reaction product of said Mannich Base condensate and said prepolymer characterized by being capable of forming salts with acetic acid which are at least water dispersible, and
B. reacting at least one aldehyde selected from the group consisting of an aldehyde and an aldehyde liberating composition in an amount sufficient to react with at least one of the available reactive hydrogen atoms present in said Mannich Base condensate and in said reaction product of Mannich Base condensate and prepolymer at from about 5° to about 110° C. from about 1 to about 20 hours to form alkylol groups, and
C. adding to said treating agent
1. from 0 to about 20 per cent by weight of said treating agents of an acid containing from one to four carbon atoms,
2. from 0 to about 20 percent by weight of said treating agent of a surfactant,
3. from 0 to about 80 percent by weight of said treating agent of a pigment, and
4. from 0 to about 99 percent by weight of said treating agent of a solvent selected from the group consisting of water, alcohols, chlorinated hydrocarbons, and aromatic hydrocarbons,
to obtain said composition.

24. The process of claim 23 wherein said organic polyisocyanate is tolylene diisocyanate.

25. The process of claim 23 wherein said alkanolamine is diethanolamine.

26. The process of claim 23 wherein said aldehyde is formaldehyde.

27. The process of claim 23 including the step of further reacting said Mannich Base condensate at about 5° to about 110° C. for about 1 to about 20 hours with at least one aldehyde selected from the group consisting of an aldehyde and an aldehyde liberating composition thereof in an amount sufficient to react with one of the available reactive hydrogen atoms present in 2 moles of Mannich Base condensates to form a mole of bis Mannich Base condensate.

28. The process of claim 23 including the step of further reacting said reaction product of said Mannich Base condensate and said prepolymer at about 5° to about 110° C., for about one to about 20 hours with at least one aldehyde selected from the group consisting of an aldehyde and an aldehyde liberating composition thereof in an amount sufficient to react with at least one of the available reactive hydrogen atoms present in said reaction product of said Mannich Base condensate and said prepolymer to form alkylol groups.

29. The process of claim 23 including the steps of further reacting said Mannich Base condensate at about 5° to about 110° C. for about one to about 20 hours with at least one aldehyde selected from the group consisting of an aldehyde and an aldehyde liberating composition thereof in an amount sufficient to react with one of the available reactive hydrogen atoms present in two moles of Mannich Base condensates to form a mole of bis Mannich Base condensate and further reacting said reaction product of said bis Mannich Base condensate and said prepolymer at about 5° to about 110° C. for about 1 to about 20 hours with at least one aldehyde selected from the group consisting of an aldehyde and an aldehyde liberating composition thereof in an amount sufficient to react with at least one of the available reactive hydrogen atoms present in said reaction product of said bis Mannich Base condensate and said prepolymer to form alkylol groups.

30. The process of claim 23 wherein said aldehyde is at least one aldehyde selected from the group consisting of an aldehyde having from one to seven carbon atoms and an aldehyde liberating composition thereof, said alkanolamine is at least one alkanolamine selected from the group consisting of a monoalkanolamine and a dialkanolamine wherein the alkylene group of said alkanolamine has from two to four carbon atoms, and said prepolymer is the reaction product of an organic polyisocyanate and at least one member selected from the group consisting of a polyoxyalkylene polyol having a molecular weight of from 300 to 5,000 and a polyester having at least two terminal hydroxyl groups and a molecular weight of from 300 to 5,000.

31. The process of claim 30 wherein from about 1 to 6 moles of said aldehyde and alkanolamine, present in approximately equimolar amounts with respect to each other, are condensed with about 1 mole of said amino resin base.

* * * * *

PO-1050
(5/69)

UNITED STATES PATENT OFFICE
CERTIFICATE OF CORRECTION

Patent No. __3,627,719__　　　　Dated __December 14, 1971__

Inventor(s) __Lucien Sellet__

It is certified that error appears in the above-identified patent and that said Letters Patent are hereby corrected as shown below:

Column 1, line 33, "substances" should be --substrates--. Column 3, line 65, "12" should be --3--. Column 6, line 56 "(PAP-1)" should be --PAPI-1--. Column 7, line 11, "polyesters" should be --polyethers--; column 7, line 15, "3,000" should be --such--. Column 8, line 2, "diamino-olxylene" should be --diamino-o-xylene--. Column 9, line 24, after the word "alkylene" insert --glycol--. Column 10, line 36, "As" should be --An--. Column 11, line 50, "tertiary" should be --the--; column 11, lines 51 & 52, the words "the triethylenediamine, N-methyldicyclohexylamine," should be --the reaction mixture is--; column 11, line 53, "tin salts" should be --within this--. Column 12, line 36, "120°C" should be --110°C--. Column 14, line 21, "of" should be --or--. Column 15, line 24, "0.1" should be --0.01--. Column 16, line 58, "+" should be --°(degree); column 16, line 70, after the word "Base" insert --condensate--. Column 17, line 29, "bLC" should be --°C.--. Column 18, line 42, "decease" should be --decrease--. Column 19, line 29, "1/2 1/2" should be --99--; column 19, line 43, "G." should be --g.--; column 19, line 50, "of" should be --on--; column 19, line 75, "was" should be --were--. Column 22, line 29, "from" should be --to about--. Column 23, line 7, "nd" should be --and--. Column 24, lines 9 thru 12, cancel "sorbitan monolaurate... span 20," and insert --a monoalkanolamine; and a dialkanolamine; wherein the alkylene groups of said alkanolamine have from two to four carbon atoms and--; column 24, line 46, delete "where"; column 24, line 69, "formaldehyde" should be --monoethanolamine--. Column 25, line 25, "claim 1" should be --claim 14--; column 25, line 26, "polyotypropylene" should be --polyoxypropylene--; column 25, line 64, before "from" insert --having--; column 25, line 65, "alaknol-amine" should be --alkanol-amine--.

Signed and sealed this 15th day of May 1973.

(SEAL)
Attest:

EDWARD M. FLETCHER, JR.
Attesting Officer

ROBERT GOTTSCHALK
Commissioner of Patents